Patented Jan. 30, 1934

1,945,405

UNITED STATES PATENT OFFICE 1,945,405

PRODUCTION OF PYRANTHRONE DYESTUFFS

Wilfred M. Murch, Hamburg, N. Y., assignor to National Aniline and Chemical Company, New York, N. Y., a corporation of New York No Drawing. Application April 24, 1931
Serial No. 532,697

9 Claims. (Cl. 260—61)

The present invention is concerned with improvements in or relating to the production of new coloring matters of the pyranthrone series which are vat dyestuffs suitable for dyeing textile fibres, especially cotton, various shades of brown. The dyed fibres or fabrics, and other material, dyed with the new coloring matters also form a part of the present invention.

It is well known that chlorine derivatives of pyranthrone can be obtained by the action of chlorine, or of an agent evolving chlorine, on pyranthrone in the presence of a suitable solvent or diluent, and in the presence or absence of a catalyst (Cf. German Patent Nos. 186,596 and 218,162; British Patent No. 10,505 of 1906; and United States Patent No. 876,810). The chlorinated pyranthrones thus normally obtained are sparingly soluble in nitrobenzene, particularly at temperatures below about 100° C. They are soluble in alkaline sodium hydrosulfite solutions yielding bluish-red vats which produce on cotton, and other fibres, bluish-red shades which on exposure to air, or upon washing, are converted to orange to reddish-orange shades.

It has now been found that upon subjecting pyranthrone to the action of sulfuryl chloride in the presence of iodine and of an aromatic nitro compound such as, for example, nitrobenzene, at temperatures ranging, for instance, from 60° to about 140° or 150° C., preferably from about 90° to 110° C., the resulting reaction mass contains in addition to a chloro-pyranthrone which is relatively insoluble in nitrobenzene, new dyestuffs which are comparatively soluble in nitrobenzene.

It has been further found that the amount of chloro-pyranthrone which is produced tends to decrease as the temperature at which the reaction is carried out is increased, and, generally speaking, upon carrying out the process at more elevated temperatures, e. g., from 150° to 210° C., the resulting reaction mass, in addition to the nitrobenzene, consists mainly or exclusively of the new dyestuffs, there being present very little, if any, chloro-pyranthrone.

In accordance with the present invention, therefore, the new dyestuffs can be obtained by treating pyranthrone with sulfuryl chloride in the presence of iodine and of an aromatic nitro compound, particularly nitrobenzene, preferably at temperatures above 60° C., e. g., between about 60° and 210° C., and more particularly at temperatures intermediate thereto, as, for example, between 90° and 110° C., and recovering the new dyestuffs which are present in the reaction mass preferably subsequent to the removal of most or all of the insoluble material, such as chloro-pyranthrone, which may be present. The chloro-pyranthrone may be separated from the new dyestuffs by fractional crystallization or precipitation from the nitrobenzene solution leaving the new dyestuffs in solution from which they may be recovered in any suitable manner, as, for example, by evaporating or distilling off, preferably under a vacuum, most or all of the excess nitrobenzene.

The new coloring matters, in the dry state, are dark brown powders, insoluble in water, in dilute alkali, and in dilute acid. They are soluble in concentrated sulfuric acid giving blue to brown solutions which upon addition of boric acid remain substantially unchanged. They are distinguished from the chloro-pyranthrones by their greater solubility in hot or in cold nitrobenzene, and upon yielding reddish-violet to brownish-violet colored hydrosulfite vats which produce on cotton, and other fibres, similar shades which upon atmospheric oxidation, or upon washing, change to light reddish-brown to dark yellowish-brown shades. Upon treating the dyestuff itself, or on treating it on the fibre, with an appropriate oxidizing agent such as sodium hypochlorite, the color of the dyestuff is changed to redder tones. The new dyestuffs contain about 5 to 17 per cent. of chlorine but otherwise their composition and constitution are unkown.

The following examples will further illustrate the invention, it being understood that the invention is not limited thereto. The parts are by weight.

*Example 1.*—100 parts of pyranthrone are heated with 1000 parts of nitrobenzene, 4 parts of iodine, and 120 parts of sulfuryl chloride, with stirring, at 100° C. under a reflux condenser for 2 hours. The mixture is then cooled to 80° C. and filtered to remove the chloro-pyranthrone which is present in suspension. The filtrate is then concentrated by distilling off about 80 to 90 per cent. of the nitrobenzene, preferably under a vacuum, the residue is cooled to room temperature, and the separated dyestuff is filtered off, washed with benzene, and then dried. The coloring matter thus obtained can be converted into the condition of a paste by dissolving it in concentrated sulfuric acid, pouring the solution into water, heating the mixture to the boiling temperature, filtering, and washing the precipitate first with water, then with a dilute sodium carbonate solution, and finally with water until it is free from soluble matter.

The dyestuff thus obtained, in the dry state, is a dark brown powder insoluble in water, in dilute acids, in dilute alkali, and in benzene. It is soluble in concentrated sulfuric acid giving a blue solution. It contains in its composition about 10 to 15 per cent. of chlorine. No formula can be assigned to it since its constitution is not known. It differs from the known chloro-pyranthrones in that it yields a reddish-violet colored vat with alkaline sodium hydrosulfite which dyes cotton similar shades which upon exposure to atmospheric oxidation change to light reddish-brown to yellowish-brown shades. On treating the dyed cotton with a sodium hypochlorite solution, the brown shade becomes redder in tone.

*Example 2.*—10 parts of pyranthrone are heated with 1000 parts of nitrobenzene, 1.25 parts of iodine, and 200 parts of sulfuryl chloride, with stirring, under a reflux condenser for one hour at 90° to 140° C., and then for one hour at 140° C. to 205° C. After removing the reflux condenser and distilling off the excess sulfuryl chloride, the nitrobenzene is removed by steam distillation, or by distillation under a vacuum. The dyestuff thus obtained, in the dry state, is a dark brown powder which is soluble in concentrated sulfuric acid giving a brown solution, and said dyestuff yields a brownish-violet sodium hydrosulfite vat which produces brownish-violet shades on cotton which upon exposure to air changed to dark yellowish-brown shades. Upon treating the dyed cotton with a solution of sodium hypochlorite, the yellowish-brown shades are changed to reddish-brown shades. The constitution of the dyestuff is not known. It contains in its composition about 5 to 8 per cent. of chlorine.

In the above examples, a crude pyranthrone, particularly one which has been obtained from 2.2'-dimethyl-1.1'-dianthraquinonyl, can be used in place of a pure, or a purified pyranthrone. Moreover, similar results may be secured by using other aromatic nitro compounds, particularly those of the benzene series, such as chlor-nitrobenzene, chlor-nitrotoluene, etc., in place of nitrobenzene.

It will be understood that the details in the process of producing the present dyestuffs can be varied considerably without departing from the spirit or the scope of the invention. For example, the proportions employed of nitrobenzene, of sulfuryl chloride, and of iodine may be varied over a wide range and similar results can be secured. It may be pointed out that a change in the proportions of initial material employed, as well as the employment of different temperatures, will vary to some extent the color of the resulting dyestuff as well as the shade of brown which it produces when dyed on cotton and other fibres.

This application is a continuation in part of my application, Serial No. 228,698, filed October 25, 1927.

I claim:

1. A process of producing a new vat dyestuff which comprises subjecting pyranthrone to the action of sulfuryl chloride in the presence of iodine and of an aromatic nitro compound, removing any insoluble chloro-pyranthrone which may be present in the reaction mass and recovering the new vat dyestuff from the residual reaction mass.

2. A process of producing a new vat dyestuff which comprises subjecting pyranthrone to the action of sulfuryl chloride in the presence of iodine and of an aromatic nitro compound of the benzene series at a temperature above 60° C., filtering the fluid reaction mixture below a temperature of about 100° C. to remove any insoluble material which may be present, evaporating the filtrate, and recovering the new vat dyestuff which separates out of the residual liquor.

3. A process of producing a new vat dyestuff which comprises heating pyranthrone with sulfuryl chloride and iodine in the presence of nitrobenzene at a temperature of 60° to 210° C., at the completion of the reaction removing at a temperature not above about 100° C. any insoluble material present in the reaction mass, and recovering the new vat dyestuff which is present in the residual nitrobenzene liquor.

4. A process of producing a new vat dyestuff which comprises heating pyranthrone with sulfuryl chloride and iodine in the presence of nitrobenzene at a temperature of about 90° to 110° C., at the completion of the reaction filtering off any insoluble material which may be present in the reaction mass, distilling the filtrate to remove excess nitrobenzene, and recovering the new vat dyestuff which separates out of the residual liquor.

5. As new products, the vat dyestuffs obtainable by reacting pyranthrone with sulfuryl chloride in the presence of iodine and of an aromatic nitro compound, removing the insoluble chloro-pyranthrone which may be present in the reaction mass, and recovering the said vat dyestuffs from the residual reaction mass, said vat dyestuffs being, in the dry state, dark brown powders soluble in concentrated sulfuric acid giving blue to brown solutions, and soluble in sodium hydrosulfite solutions giving reddish-violet to brownish-violet colored vats which produce on cotton similar shades which on exposure to air change to reddish-brown to yellowish-brown shades.

6. As new products, the vat dyestuffs obtainable by reacting pyranthrone with sulfuryl chloride in the presence of iodine and of an aromatic nitro compound of the benzene series at a temperature of 60° to 210° C., removing at a temperature not above about 100° C. any soluble material which may be present in the reaction mass, and recovering from the residual reaction mass the said vat dyestuffs, said vat dyestuffs being, in the dry state, dark brown powders soluble in concentrated sulfuric acid giving blue to brown solutions, and soluble in sodium hydrosulfite solutions giving reddish-violet to brownish-violet colored vats which produce on cotton similar shades which on exposure to atmospheric oxidation change to reddish-brown to yellowish-brown shades.

7. As new products, the vat dyestuffs obtainable by reacting pyranthrone with sulfuryl chloride in the presence of iodine and of nitrobenzene at a temperature of 60° to 150° C., removing any insoluble chloro-pyranthrone which may be present in the reaction mass, and recovering said dyestuffs from the residual reaction mass, said dyestuffs, in the dry state, being dark brown powders which yield reddish-violet hydrosulfite vats which produce on cotton a similar shade which on exposure to air change to reddish-brown shades.

8. As new products, the vat dyestuffs obtainable by reacting pyranthrone with sulfuryl chloride in the presence of iodine and of nitrobenzene at a temperature of 90° to 110° C., filtering off any insoluble chloro-pyranthrone which may be present in the reaction mass, and recovering the said dyestuffs from the filtrate by distilling off, under a vacuum, the excess nitrobenzene, said dyestuffs, in the dry state, being dark brown powders which yield a reddish-violet hydrosulfite vat which produce similar shades on cotton which on exposure to air change to light reddish-brown shades.

9. As new products, the new vat dyestuffs obtainable by reacting pyranthrone with sulfuryl chloride and iodine in the presence of nitrobenzene at a temperature of about 150° to 210° C., removing at a temperature not above about 100° C. any insoluble material which may be present in the reaction mass, and recovering said dyestuffs from the residual reaction mass, said dyestuffs, in the dry state, being dark brown powders which yield a brownish-violet hydrosulfite vat which produce similar shades on cotton which on exposure to atmospheric oxidation change to dark yellowish-brown shades.

WILFRED M. MURCH.

CERTIFICATE OF CORRECTION.

Patent No. 1,945,405.  January 30, 1934.

WILFRED M. MURCH.

It is hereby certified that error appears in the printed specification of the above numbered patent requiring correction as follows: Page 2, line 119, claim 6, for "soluble" read insoluble; and that the said Letters Patent should be read with this correction therein that the same may conform to the record of the case in the Patent Office.

Signed and sealed this 13th day of March, A. D. 1934.

F. M. Hopkins (Seal) Acting Commissioner of Patents.